(12) United States Patent
Caprini

(10) Patent No.: US 11,122,834 B2
(45) Date of Patent: Sep. 21, 2021

(54) METHOD FOR DRYING FILTER RODS

(71) Applicant: PHILIP MORRIS PRODUCTS S.A., Neuchatel (CH)

(72) Inventor: Gianni Caprini, Zola Predosa (IT)

(73) Assignee: Philip Morris Products S.A., Neuchatel (CH)

( * ) Notice: Subject to any disclaimer, the term of this patent is extended or adjusted under 35 U.S.C. 154(b) by 125 days.

(21) Appl. No.: 15/752,917

(22) PCT Filed: Aug. 23, 2016

(86) PCT No.: PCT/EP2016/069842
§ 371 (c)(1),
(2) Date: Feb. 15, 2018

(87) PCT Pub. No.: WO2017/032755
PCT Pub. Date: Mar. 2, 2017

(65) Prior Publication Data
US 2018/0255830 A1    Sep. 13, 2018

(30) Foreign Application Priority Data

Aug. 24, 2015 (EP) ..................................... 15182185

(51) Int. Cl.
*A24D 3/02*    (2006.01)
(52) U.S. Cl.
CPC ......... *A24D 3/0233* (2013.01); *A24D 3/0229* (2013.01); *B01D 2257/80* (2013.01)
(58) Field of Classification Search
None
See application file for complete search history.

(56) References Cited

U.S. PATENT DOCUMENTS

| 3,297,512 | A | * | 1/1967 | Cobb, Jr. ............... B01D 39/18 156/433 |
| 3,428,723 | A | | 2/1969 | Harrington, Jr. |
| 3,812,598 | A | | 5/1974 | Lefebvre |

(Continued)

FOREIGN PATENT DOCUMENTS

| CN | 102798270 | 11/2012 |
| GB | 396230 | 8/1933 |

(Continued)

OTHER PUBLICATIONS

PCT Search Report and Written Opinion for PCT/EP2016/069842 dated Nov. 17, 2016 (12 pages).

(Continued)

*Primary Examiner* — Hemant Desai
*Assistant Examiner* — Tanzim Imam
(74) *Attorney, Agent, or Firm* — Mueting Raasch Group

(57) ABSTRACT

The method for drying filter rods comprises the steps of providing a filter rod, providing a support surface (2) for receiving the filter rod (4) and guiding the filter rod on the support surface by a guide element (1) arranged above the support surface. The method further comprises the step of supplying a gas stream of compressed gas having a pressure between 0 and 6 bar to the filter rod through the guide element when the filter rod is transported along the support surface, before wrapping the filter rod with a wrapping material (5).

20 Claims, 3 Drawing Sheets

(56) References Cited

U.S. PATENT DOCUMENTS

| | | | | |
|---|---|---|---|---|
| 4,903,714 | A * | 2/1990 | Barnes | A24D 1/22 131/335 |
| 2007/0068540 | A1 * | 3/2007 | Thomas | A24D 3/061 131/88 |
| 2008/0029118 | A1 * | 2/2008 | Nelson | A24D 3/0229 131/365 |
| 2012/0115696 | A1 * | 5/2012 | Davis | A24D 3/0287 493/39 |
| 2012/0122639 | A1 * | 5/2012 | Davis | A24D 3/0212 493/39 |
| 2013/0023395 | A1 * | 1/2013 | Nakamura | A24D 3/022 493/328 |
| 2013/0337987 | A1 * | 12/2013 | Kato | A24D 3/0212 493/44 |
| 2014/0034571 | A1 * | 2/2014 | Torai | A24D 3/0233 210/497.01 |
| 2014/0171281 | A1 * | 6/2014 | Park | A24D 3/0258 493/42 |
| 2014/0196728 | A1 | 7/2014 | Lisan | |
| 2015/0164133 | A1 * | 6/2015 | Davis | A24D 3/025 131/332 |

FOREIGN PATENT DOCUMENTS

| | | | |
|---|---|---|---|
| GB | 1314511 | 4/1973 | |
| RU | 2013158009 | 8/2015 | |
| WO | WO 2012/132972 | 10/2012 | |
| WO | WO 2013/004994 | 1/2013 | |
| WO | WO 2014/199284 | 12/2014 | |
| WO | WO-2014199284 A1 * | 12/2014 | |
| WO | WO-2015011830 A1 * | 1/2015 | A24D 3/0233 |

OTHER PUBLICATIONS

Office Action issued in Russia for Application No. 2018/109909 dated Feb. 10, 2020 (12 pages). English translation included.

Office Action issued in China for Application No. 201680044585.4 dated Feb. 3, 2020 (18 pages). English translation included.

Office Action issued in China for Application No. 201680044585.4 dated Oct. 10, 2020 (15 pages). English translation included.

* cited by examiner

METHOD FOR DRYING FILTER RODS

This application is a U.S. National Stage Application of International Application No. PCT/EP2016/069842, filed Aug. 23, 2016, which was published in English on Mar. 2, 2017, as International Publication No. WO 2017/032755 A1. International Application No. PCT/EP2016/069842 claims priority to European Application No. 15182185.7 filed Aug. 24, 2015.

The invention relates to a method for drying filter rods. In particular, it relates to a method for drying filter rods before wrapping the filter rods with wrapping material.

In general, consumables used in electronic smoking devices are assembled from several segments. One of these segments may be a hollow acetate tube. The tube is manufactured from an endless hollow acetate rod, which rod is wrapped in wrapping paper and cut to a desired length. The wrapped and cut rods are intermediately stored before being further processed, for example before being assembled with other segments to form a consumable. The acetate material preparation may require vapour treatment. Part of the vapour is still present in the rod material and also in the segments cut from the rod. This may lead to water condensation in an intermediate storage location of the rod segments. The water condensation may negatively influence the further processing of the segments. For example, segments may stick together and hinder a further transport of the segments. Water may also moisten the paper wrapper of the segments, which may lead to a bumpy surface and anaesthetic appearance. Water may also be transported by a segment and possibly damage other segments used in the manufacturing process of consumable.

Therefore, it would be desirable to have a humidity content in a filter rod as low as to limit or eliminate water condensation in an intermediate storage location of the filter rod or of segments cut from the filter rod.

According to an aspect, there is provided an apparatus for treating filter rods, in particular for drying filter rods. The apparatus comprises a support surface for receiving a filter rod on the support surface and a wrapping device for wrapping a wrapping material around the filter rod. The apparatus further comprises a guide element arranged above the support surface and at a distance from the support surface. The guide element is provided and adapted for guiding the filter rod on the support surface in between the guide element and the support surface. The guide element is provided with a gas inlet and at least one gas outlet for supplying a drying gas to the filter rod when the rod is transported along the support surface.

The filter rod may be held against the support surface by the guide element, while the guide element guides the filter rod on the support surface. Preferably, the guide element is stationary, while the filter rod moves along the support surface. A distance between guide element and support surface may be chosen such that a filter rod may be transported between guide element and support surface, preferably without damaging or deforming the filter rod. The distance may be chosen to provide a certain pressure onto the filter rod to hold the filter rod safely against the support surface or against a wrapping material arranged on the support surface.

A distance between guide element and support surface may be fix but variable in order to be able to adapt the apparatus to the treatment of filter rods having different diameters.

The wrapping material for wrapping the filter rod may be arranged and transported along the support surface. Preferably, the wrapping material is arranged on the support surface before the filter rod is arranged on the support surface. By this, the filter rod comes to lie on the wrapping material. Thus, the guide element holds the filter rod on the wrapping material before both, filter rod and underlying wrapping material are transported into the wrapping device for wrapping the filter rod. During this guiding, a gas stream is directed to the filter rod through the at least one outlet opening in the guide element for treating, preferably drying, the filter rod. Excess moisture may thus be removed from the filter rod by the provision of gas. Since the filter rod is not yet wrapped while being guided on the support surface, it is directly the filter material which is exposed to the gas stream. This typically allows for an efficient removal of moisture or of other volatile substances from the filter rod without barrier due to a wrapper.

The filter rod may be a continuous rod of filter tow, thus a continuous filter rod, or individual filter rod segments, for example a filter rod out of a series of filter rods. Preferably, a continuous filter rod is provided from a rod forming device to the apparatus according to the invention, for example supplied to the support surface of the apparatus. If individual filter rod segments are provided, preferably a series of filter rods arranged in an end-to-end manner are provided to the support surface.

The filter rod may be a filter rod as known in the art. Preferably, the filter rod is a filter rod for use in aerosol-generating articles for electronic aerosol-generating devices. The filter rod may be a hollow filter rod, for example in the form of a hollow tube. The filter rod may also be a tubular element entirely filled with filter material.

The apparatus may comprise a rod supply device for providing a filter rod to the support surface. The rod supply device may be a reservoir of filter rods. Advantageously, the rod supply device is a rod forming device, where the filter rod is manufactured. A rod forming device may, for example, be a rod forming device as described in the US patent application US 2014/0034571. In US 2014/0034571 a continuous cellulose acetate tow is formed into a continuous hollow filter tube. The cellulose acetate tow is made to pass through a tubular forming path, wherein a hollow tube is formed and stabilized by heat treatment of the tow material during forming.

The filter rod may comprise or be made of any material suitable for filter production. The filter rod may, for example, comprise or be made of polymer materials that may be brought into a desired shape by heat treatment.

Preferably, the filter rod comprises at least one of cellulose acetate or polylactic acid (PLA) material. Preferably, the filter rod is a hollow acetate tube (HAT).

The above filter materials typically have hydrophilic properties or alternatively or in addition are vapour treated to remove or reduce undesired substances from the materials. In either case, moisture content may lead to water condensation with its adverse effects as mentioned above. To reduce moisture content in the filter rod before said filter rod is wrapped with the wrapping material in the wrapping device, for example with a filter wrapping paper, a gas stream is directed to the filter rod.

The at least one gas outlet is arranged in the guide element such as to direct a gas stream into the direction of the support surface. Preferably, the at least one gas outlet is arranged to direct the gas stream vertically onto the support surface. In operation, the filter rod is arranged between the guide element and the support surface such that the gas stream is directed to the filter rod, preferably vertically onto the filter rod. 'Vertically' or a vertical direction may be exact vertically or may also be substantially vertically, wherein 'substantially vertically' includes directions deviating from the exact vertical direction by plus or minus 45 degree.

The guide element of the apparatus may comprise a plurality of gas outlets. The plurality of gas outlets may then, for example, be arranged along a length of the guide element. The plurality of gas outlets may be arranged equidistantly along the length of the guide element. The plurality of gas outlets may also be arranged in the guide element in different arrangements. The plurality of gas outlets may, for example, be arranged in an irregular arrangement in the guide element or in a further upstream portion of the guide element or a further downstream portion of the guide element.

Each of the gas outlets of the plurality of gas outlets is arranged to direct a plurality of gas streams into the direction of the support surface. Preferably, the plurality of gas outlets is arranged to direct the plurality of gas streams vertically or substantially vertically onto the support surface. However, one or several gas outlets of the plurality of gas outlets may also be arranged to direct one or several gas streams in a direction other than in a vertical direction. For example, a gas stream may be arranged into a transport direction of the filter rod or opposite a transport direction of the filter rod.

By a plurality of gas outlets and a corresponding plurality of gas streams, the filter rod may be subjected to gas, preferably drying gas, substantially during the entire time period the filter rod is guided by the guide element or passes the guide element, respectively. Depending on the direction of the gas streams a treatment of the filter rod may already be started shortly before a filter rod is guided by the guide element and may continue until shortly after the filter rod has passed the guide element.

As used herein, the terms 'upstream' and 'downstream' when used to describe the relative positions of elements of the apparatus refer to the direction in which the filter rod and wrapping material moves during the transporting, treating and wrapping process. That is, the filter rod moves in a downstream direction from an upstream end to a downstream end.

Preferably, the plurality of gas outlets is connected to the gas inlet. Advantageously, the gas inlet is arranged in an upstream portion of the guide element such that a gas supplied to the gas inlet may be distributed to the one or the plurality of gas outlets and such that a distributing direction substantially corresponds to a transport direction of the filter rod.

More than one gas inlet, for example two gas inlets, may be provided for the supply of one or more gases to the guide element. More than one gas inlet may also be provided for connecting one or more gas outlets of the plurality of gas outlets with one gas inlet and connecting one or more further gas outlets of the plurality of gas outlets with one or more further gas inlets.

If several gas inlets are provided in the guide element, several, in particular different, gas sources may be connected to different gas inlets. Different gases may, for example, differ in gas composition or gas temperature.

The filter materials used for manufacturing filter rods may be temperature sensitive, in particular filter materials that are used in filter manufacturing processes with heat treatment.

Accordingly, a gas temperature of a treatment gas, in particular a drying gas, is preferably kept below a temperature that could cause unintentional structural or chemical changes in the filter rod. Preferably, the gas of the gas stream or of the several gas streams has a gas temperature below 40 degree Celsius. More preferably, a gas temperature for the gas stream of the plurality of gas streams is at room temperature.

Preferably, a gas source for a gas stream may be an air source, a nitrogen source or a carbon dioxide source. Advantageously, compressed gas, in particular compressed air, having a pressure of between 0 bar and 6 bar, preferably between 1 bar and 4 bar or between 0 bar and 2 bar, preferably between 1.2 bar and 2 bar, for example 1.6 bar is used as treatment gas.

Preferably, the filter rod is exposed to the gas stream shortly before wrapping. In particular, the filter rod may be exposed to the gas stream less than 20 seconds, in particular less than 5 seconds, or less than 1 second or 0.2 second before being wrapped with the wrapping material.

Preferably, free moisture present in the filter rod when the filter rod is wrapped is reduced by at least 10 percent, or at least 20 percent, or at least 40 percent, or at least 60 percent in weight compared to the free moisture present in the filter rod immediately before exposure to the gas stream.

The guide element may comprise a guide surface for contacting the filter rod. Thereby, the filter rod is arranged between the guide surface of the guide element and the support surface. Preferably, the at least one gas outlet or the plurality of gas outlets are arranged in the guide surface of the guide element. Advantageously, the guide surface has a shape corresponding to the shape of the filter rod. Preferably, the guide surface has a longitudinal concave shape. The longitudinal concave shape may correspond to the shape and size of the filter rod guided by the guide surface of the guide element.

The guide element may be made of a material that provides good machinability to arranged gas inlets and outlets and corresponding gas channels in the guide element. Advantageously, the guide element is inert against the gas or gases guided through the gas channels in the guide element. Preferably, the guide element is made of metal. A metallic guide element may provide sufficient weight to hold a filter rod against the support surface by the weight of the guide element only.

According to the invention, there is provided a method for drying filter rods. The method comprises the steps of providing a filter rod and supplying a gas stream to the filter rod, before wrapping the filter rod with a wrapping material.

Preferably, the step of supplying a gas stream to the filter rod is performed by supplying the gas stream through a guide element, while guiding the filter rod by the guide element on and along a support surface, that is, when the filter rod is arranged on the support surface.

A further step of the method according to the invention may comprise arranging the wrapping material between the filter rod and the support surface. Filter rod and wrapping material are then transported, preferably in parallel and at a same speed, along the support surface to a wrapping device wherein the wrapping material is entirely wrapped around the filter rod. The step of guiding the filter rod on the support surface may comprise guiding the filter rod by a concave guide surface of a guide element, wherein the concave guide surface is in contact with the filter rod.

The method may further comprise the step of supplying several gas streams, preferably simultaneously, along the filter rod. Advantageously, the several gas streams are provided along a length of the filter rod.

Advantages and further aspects of the method according to the invention have been described relating to the apparatus and will therefore not be repeated.

Preferably, the method according to the invention is used for drying filter rods, advantageously for drying acetate tubes. Therein, the gas stream or the plurality of gas streams preferably is a drying gas stream or a plurality of drying gas streams.

The invention is further described with regard to embodiments, which are illustrated by means of the following drawings, wherein.

Figure 1:
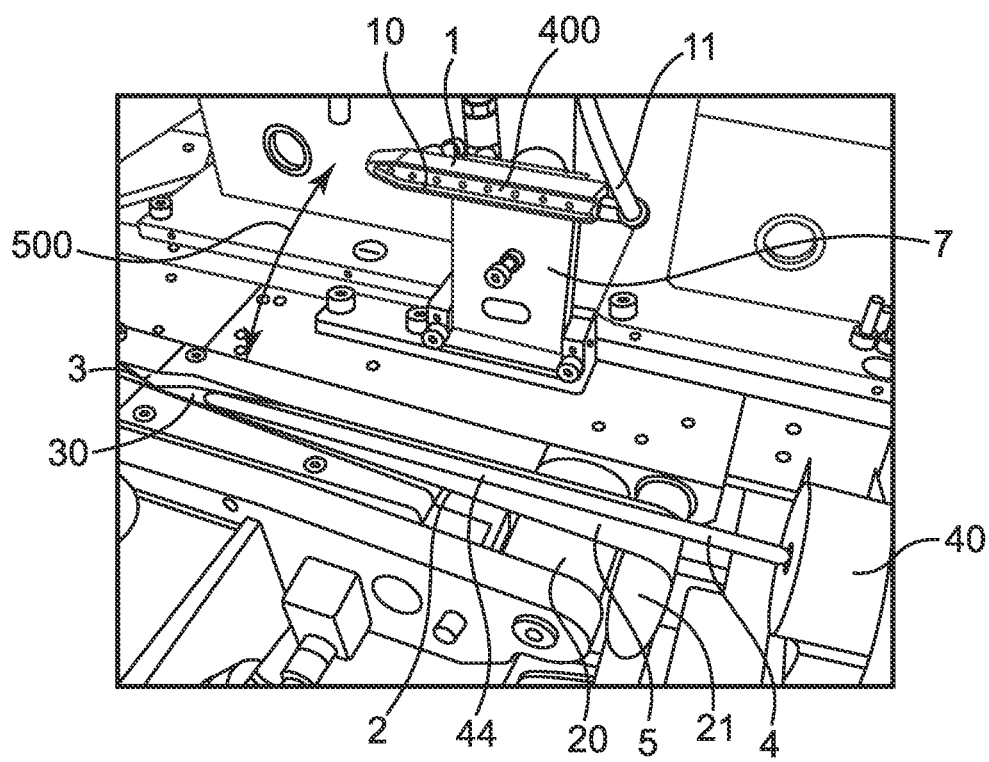
FIG. 1 shows an apparatus for treating a filter rod with a guide element in a retracted position.

In FIG. 1 a continuous filter rod 4 is provided from a rod supply 40, for example a rod forming device, to a support surface 2. The filter rod 4, for example a PLA filter rod, is guided along the support surface 2 to a wrapping device 3. In the wrapping device 3, the continuous filter rod 4 is wrapped with a continuous sheet of wrapping material 5, for example wrapping paper. The support surface 2 may comprise a longitudinal groove 30 in the form of a half circle for receiving the filter rod 4 and for supporting wrapping the wrapping material 5 around the filter rod 4.

The wrapping material 5 is supplied from below the support surface 2, for example from a bobbin, deflected via a deflection element 21 arranged upstream of the support surface 2 such as to be transported on and along the support surface 2 into the wrapping device 3.

The support surface 2 may comprise one or several rollers 20 rolling in the transport direction of the filter rod 4 and the wrapping material 5 and supporting a transport of the wrapping material 5 or the filter rod 4, respectively.

The filter rod 4 is arranged on the wrapping material 5 while moving together with the wrapping material 5 along the support surface 2.

A guide element 1 for guiding the filter rod 4 on the support surface is shown in FIG. 1 in a retracted position. In the retracted position of the guide element 1, free access to the support surface 2, the pre-wrapping process and the guide element 1 is available, for example for maintenance or inspection purposes.

Figure 2:
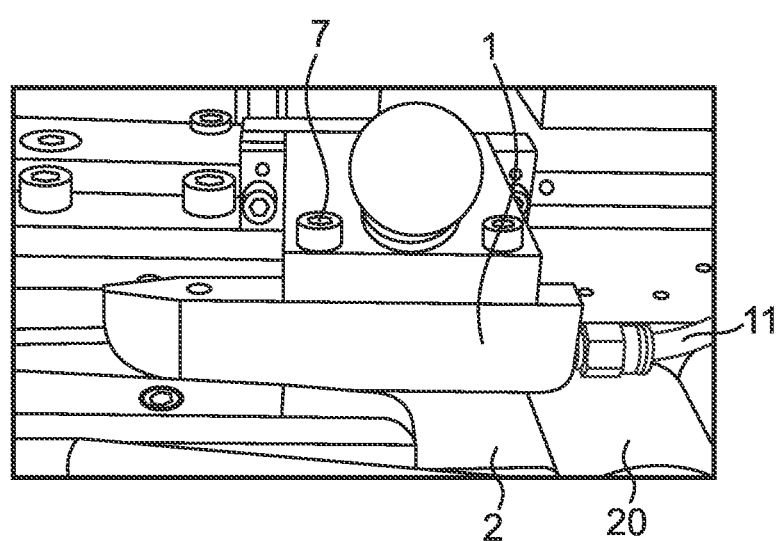
FIG. 2 shows the guide element in an operating position.

The guide element 1 is mounted to a movable positioning lever 7. By rotating the lever 7 about its hinge in the direction of arrow 500, the guide element 1 may be brought from the retracted position to an operating position. In the operating position, the guide element 1 contacts a top side 44 of the filter rod 4 and guides the filter rod 4 on the support surface 2 or on the wrapping material 5, respectively. In FIG. 2 the guide element 1 is shown in the operating position of the apparatus. In the operating position, the guide element 1 is arranged parallel to the horizontally arranged support surface 2 and parallel to the wrapping material 5 guided along the support surface 2. Filter rod 4 and wrapping material 5 are omitted in FIG. 2.

The bottom side 400 of the guide element 1 is provided with a plurality of gas outlet openings 10 arranged along the length of the bottom side 400 of the guide element 1. The rear end 200 of the guide element 1 is provided with a gas supply 11.

Figure 3:
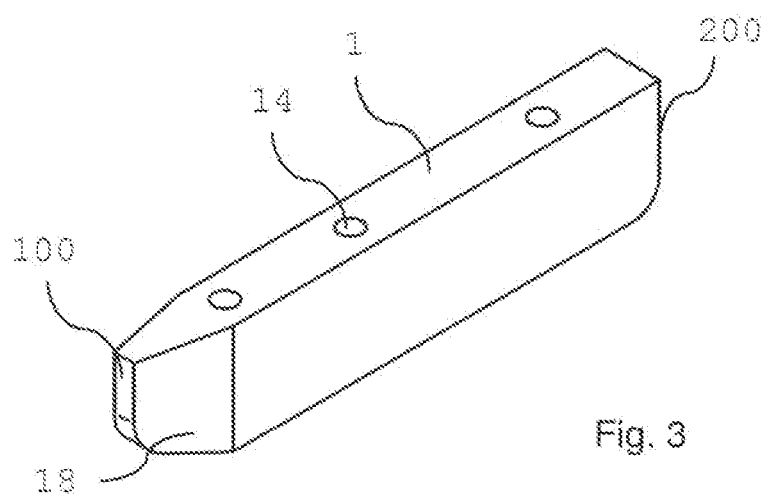
FIGS. 3 and 4 are a perspective view and a longitudinal cross section of a first embodiment of a guide element.
Figure 4:
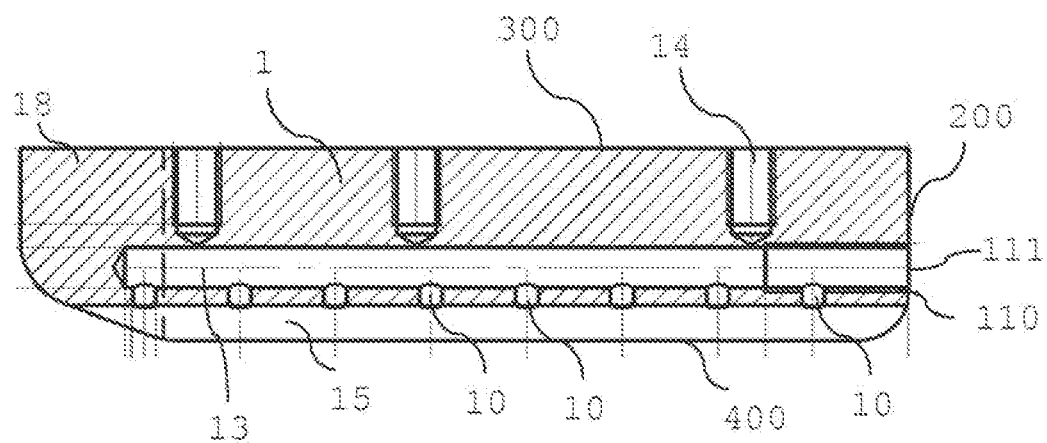

The guide element 1 is shown in more detail in FIG. 3 and FIG. 4. The rear end 200 of the guide element is provided with a gas inlet 111 connected to the gas supply 11. The gas inlet 111 is also connected via an internal channel 13 with all gas outlet openings 10. A gas source (not shown), for example a drying gas such as for example compressed air, is connected to the gas inlet 111 via a gas tube. A thread 110 may be provided for connecting the gas source via gas tube to the gas inlet 111.

The internal channel 13 extends from the rear end 200 of the guide element 1 substantially along the length of the guide element 1 up to the level of the most downstream arranged gas outlet opening 10. Via this internal channel 13, gas is guided through the guide element 1 and out of the gas outlet openings 10. When in the operating position of the guide element 1, the outlet openings 10 direct eight gas streams corresponding to the number of outlet openings 10 in the bottom side 400 of the guide element 1, vertically to the top side 44 of the filter rod 4.

Figure 5:
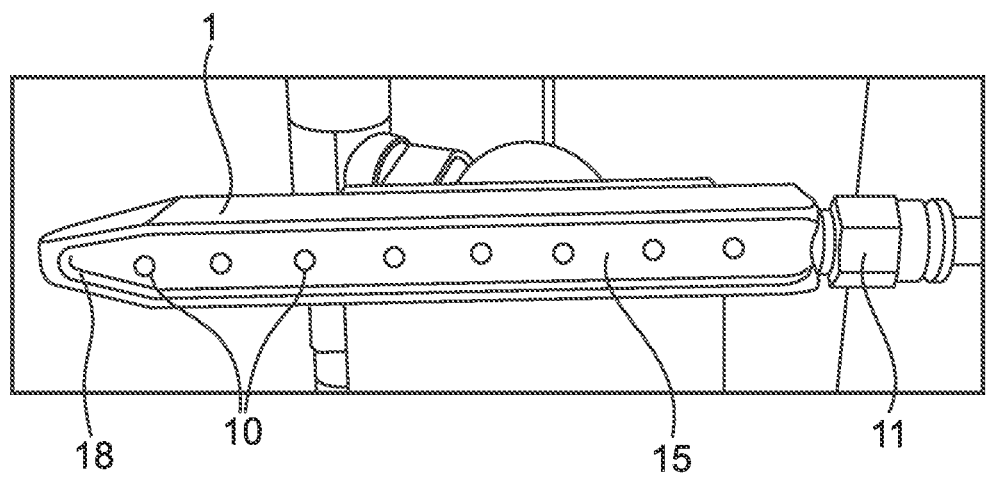
FIG. 5 shows the bottom side of the guide element of FIGS. 1 and 2.

The bottom side 400 of the guide element 1 comprises a longitudinal concave shaped guide surface 15. In FIG. 5 a view onto the concave shaped guide surface 15 of the bottom side of 400 of the guide element is shown. Preferably, the longitudinal concave form of the guide surface 15 corresponds to the circular shape of the filter rod 4. The shape of the guide surface 15 is constant along the length of the guide element 1, that is, the guide surface 15 is provided with a constant radius of curvature.

The eight gas outlet openings 10 are arranged equidistantly in the guide surface 15. Preferably, the outlet openings 10 are arranged on one longitudinal line along the length of the guide element 1. However, they may also be slightly radially displaced from said longitudinal line. For example, every other outlet opening 10 may be radially displaced to one side and to the other side of the longitudinal line.

The guide element 1 comprises a wedge shaped front portion 18, which is tapered laterally versus a front end 100 of the guide element. The tapered front portion 18 allows to position the guide element 1 close to the wrapping device 3 at a position, where the wrapping material 5 has already been wrapped partially around the filter rod 4. The wedge shaped front portion 18 secures a smooth passing of the wrapping material 5 next to the guide element 1.

In the embodiment of the guide element of FIGS. 3 and 4, the front portion 18 extends not much further than the gas channel 13 inside the gas element or the most downstream arranged outlet opening 10, respectively. Thus, together with the wedge shaped front portion 18, gas may be provided to the filter rod 4 until very shortly before the filter rod 4 is entirely wrapped with the wrapping material 5.

The guide element 1 is provided with three bore holes or threaded holes 14 in its top side 300 for attaching the guide element 1 to the positioning lever 7. Such an attachment, for example with screws, may be provided for positioning and fixing the guide element at a predefined distance to the support surface to secure a safe guiding of the filter rod 4.

In examples of a guide element 1 as shown in FIG. 3 and FIG. 4, the distances between neighbouring gas outlet openings 10 are 10 millimeter with a length of the guide element 1 of 93 millimeter and a width of 10 millimeter. A length of the front portion 18 is 15 millimeter.

Figure 6:
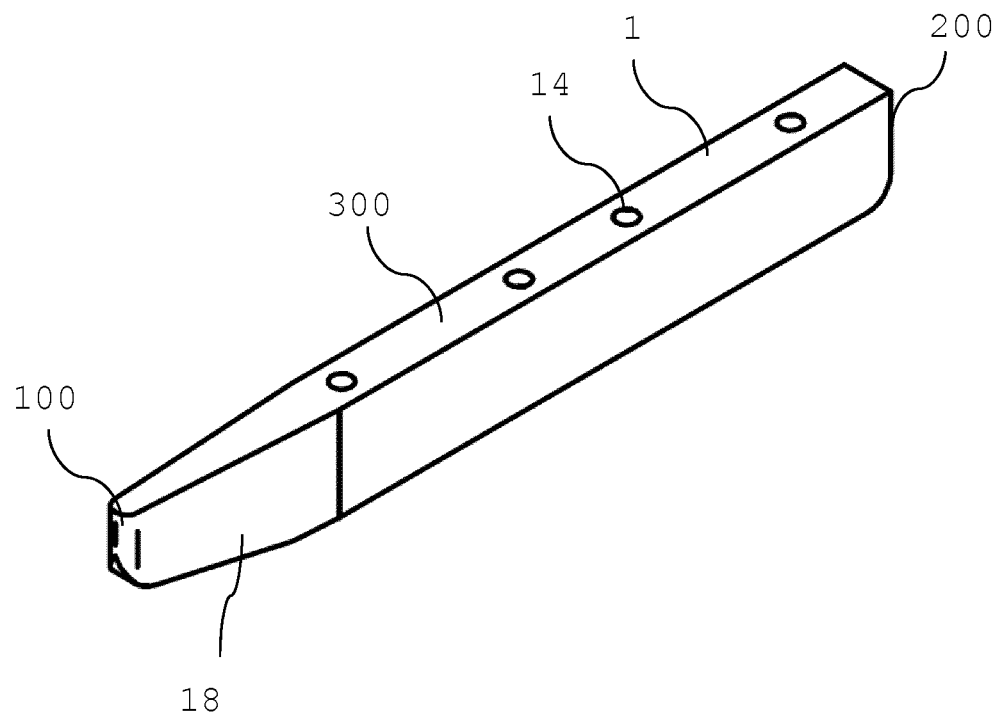
FIGS. 6 and 7 are a perspective view and a longitudinal cross section of a second embodiment of a guide element.
Figure 7:
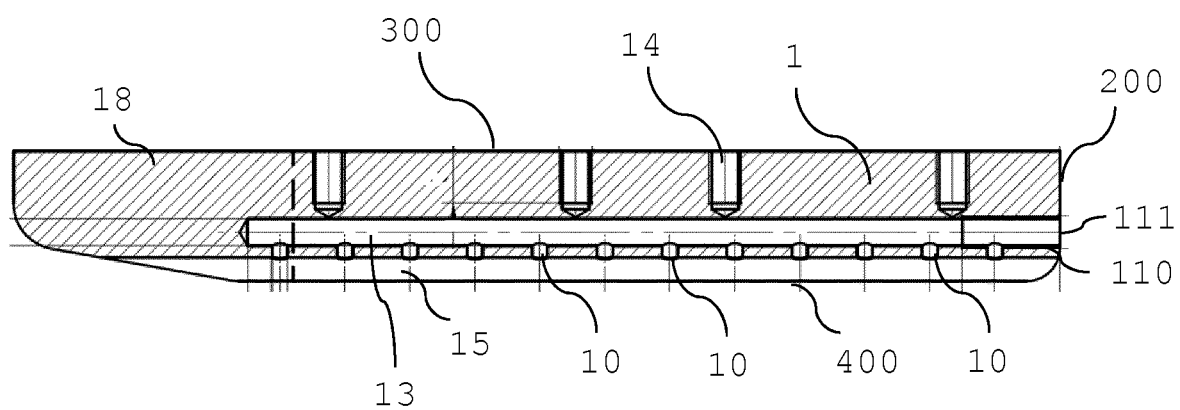

In FIG. 6 and FIG. 7 another embodiment of a guide element 1 for providing 12 gas streams to a filter rod 4 is shown. The guide element 1 as shown in FIGS. 6 and 7 may be used to provide more gas to a filter rod 4, either to expose the filter rod to gas for a longer period of time or over a same period of time at faster moving speed of the filter rod guided by the guide element 1. In FIGS. 6 and 7 the same reference numerals are used for the same or similar elements.

The bottom side 400 of the guide element 1 is provided with 12 gas outlet openings 10 arranged equidistantly along the length of the bottom side 400. The rear end 200 of the guide element is provided with a gas inlet 111 and the gas outlet openings 10 are connected via the internal channel 13 with the gas inlet 111.

The internal channel 13 extends from the rear end 200 of the guide element along the length of the guide element 1 up to the most downstream arranged gas outlet opening 10. When in the operating position, the outlet openings 10 direct 12 gas streams to the top side 44 of the filter rod 4. The outlet openings 10 are arranged to direct the gas streams vertically onto the top side 44 of the filter rod 4.

The bottom side 400 of the guide element 1 comprises a longitudinal concave shaped guide surface 15. The shape of the guide surface 15 is constant along the length of the guide element 1, that is, the guide surface 15 is provided with a constant radius of curvature.

The wedge shaped front portion 18 of the guide element 1 is tapered laterally versus a front end 100 of the guide element.

In the embodiment of the guide element of FIGS. 6 and 7, the most downstream arranged outlet opening 10 is arranged in the guide surface 15 about 50 millimeter behind the front portion 18.

The long front portion 18 allows to put pressure on a filter rod 4 until the filter rod has almost entirely entered the wrapping device 3. Thus, pressure may be applied to the filter rod 4 while a wrapping material 5 has already been, at least partially, wrapped around the filter rod. By this, sealing of the wrapping material around the filter rod, for example, by glue, may be supported, preferably, may be increased.

The guide element in the embodiment shown in FIGS. 6 and 7 is provided with four bore holes or threaded holes 14 in its top side 300 for attaching the guide element 1 to a positioning lever 7 or an otherwise constructed guide holder.

In the example of a guide element as shown in FIGS. 6 and 7, the distances between neighbouring outlet openings 10 are 10 millimeter with a length of the guide element 1 of 161 millimeter and a width of 10 millimeter. A length of the front portion is 43 millimeter.

The invention claimed is:

1. Method for drying filter rods, the method comprising the steps of:
   providing a filter rod, the filter rod being a continuous unwrapped rod of filter tow;
   providing a support surface and receiving the continuous rod of filter tow on the support surface;
   guiding the continuous rod of filter tow on the support surface by a guide element arranged above the support surface, wherein the guide element comprises a guide surface constructed to contact the filter rod, a top surface opposite to the guide surface, and two side surfaces extending between the guide surface and the top surface, each of the two side surfaces comprising a first portion having a length extending parallel to the guide surface and a second portion angled relative to the first portion and comprising a bottom edge that is angled relative to the length to form a wedge shaped front portion;
   supplying a gas stream of compressed gas having a pressure between 0 and 2 bar to the continuous rod of filter tow through the guide element to remove excess moisture from the continuous rod of filter tow when the continuous rod of filter tow is transported along the support surface, before wrapping the continuous rod of filter tow with a wrapping material to form a wrapped continuous filter rod.

2. Method according to claim 1, further comprising the step of arranging the wrapping material between the continuous rod of filter tow and the support surface.

3. Method according to claim 1, further comprising the step of supplying several gas streams simultaneously along a length of the continuous rod of filter tow.

4. Method according to claim 3, wherein the several gas streams are supplied vertically onto the continuous rod of filter tow.

5. Method according to claim 3, wherein the several gas streams have a gas temperature below 40 degree Celsius.

6. Method according to claim 1, wherein the gas stream is supplied vertically onto the filter rod.

7. Method according to claim 1, wherein the continuous rod of filter tow comprises at least one of cellulose acetate or polylactic acid material.

8. Method according to claim 1, wherein the gas stream has a gas temperature below 40 degree Celsius.

9. Method according to claim 1, wherein the continuous rod of filter tow is contacted by the guide surface of the guide element, the guide surface having a longitudinal concave shape.

10. Method according to claim 1, wherein free moisture in the wrapped continuous filter rod is reduced by at least 10 percent in weight compared to free moisture present in the filter rod immediately before exposure to the gas stream.

11. Method according to claim 1, wherein a length of the front portion of the guide element is 15 millimeter.

12. Method for drying filter rods, the method comprising the steps of:
   providing an unwrapped hollow filter rod;
   providing a support surface and receiving the hollow filter rod on the support surface;
   guiding the hollow filter rod on the support surface by a guide element arranged above the support surface, wherein the guide element comprises a guide surface constructed to contact the filter rod, a top surface opposite to the guide surface, and two side surfaces extending between the guide surface and the top surface, each of the two side surfaces comprising a first portion having a length extending parallel to the guide surface and a second portion angled relative to the first portion and comprising a bottom edge that is angled relative to the length to form a wedge shaped front portion;
   supplying a gas stream of compressed gas having a pressure between 0 and 2 bar to the hollow filter rod through the guide element to remove excess moisture from the hollow filter rod when the hollow filter rod is transported along the support surface, before wrapping the hollow filter rod with a wrapping material to form a wrapped continuous filter rod.

13. Method according to claim 12, wherein the hollow filter rod is a continuous hollow filter rod.

14. Method according to claim 13, wherein the continuous hollow filter rod is a continuous rod of filter tow.

15. Method according to claim 12, wherein the hollow filter rod comprises at least one of cellulose acetate or polylactic acid material.

16. Method according to claim 12, wherein free moisture in the wrapped continuous filter rod is reduced by at least 10 percent in weight compared to free moisture present in the hollow filter rod immediately before exposure to the gas stream.

17. Method for drying filter rods, the method comprising the steps of:

providing a continuous unwrapped filter rod comprising at least one of cellulose acetate or polylactic acid (PLA) material;

providing a support surface and receiving the continuous filter rod on the support surface;

guiding the continuous filter rod on the support surface by a guide element arranged above the support surface, wherein the guide element comprises a guide surface constructed to contact the filter rod, a top surface opposite to the guide surface, and two side surfaces extending between the guide surface and the top surface, each of the two side surfaces comprising a first portion having a length extending parallel to the guide surface and a second portion angled relative to the first portion and comprising a bottom edge that is angled relative to the length to form a wedge shaped front portion;

supplying a gas stream of compressed gas having a pressure between 0 and 2 bar to the continuous filter rod through the guide element to remove excess moisture from the continuous filter rod when the continuous filter rod is transported along the support surface, before wrapping the continuous filter rod with a wrapping material to form a wrapped continuous filter rod.

18. Method according to claim 17, wherein the continuous filter rod is a hollow filter rod.

19. Method according to claim 17, wherein free moisture in the wrapped continuous filter rod is reduced by at least 10 percent in weight compared to free moisture present in the continuous filter rod immediately before exposure to the gas stream.

20. Method according to claim 17, wherein a length of the front portion of the guide element is 15 millimeter.

* * * * *